United States Patent
Kacev et al.

(10) Patent No.: US 7,451,598 B2
(45) Date of Patent: Nov. 18, 2008

(54) TURBOCHARGED COMPRESSION IGNITION ENGINE

(75) Inventors: Peter Kacev, Argenton (AU); Greg Venticinque, Seaham (AU)

(73) Assignee: DBT Australia Pty Limited (AU)

( * ) Notice: Subject to any disclaimer, the term of this patent is extended or adjusted under 35 U.S.C. 154(b) by 0 days.

(21) Appl. No.: 11/933,233

(22) Filed: Oct. 31, 2007

(65) Prior Publication Data

US 2008/0072594 A1 Mar. 27, 2008

Related U.S. Application Data

(62) Division of application No. 10/528,819, filed as application No. PCT/AU03/00484 on Apr. 23, 2003.

(30) Foreign Application Priority Data

Sep. 25, 2002 (AU) .............................. 2002951688

(51) Int. Cl.
  F02B 33/44 (2006.01)
  F02B 77/08 (2006.01)
  F02M 17/30 (2006.01)
  F04B 17/00 (2006.01)
  F04B 35/00 (2006.01)

(52) U.S. Cl. .................. 60/605.1; 123/198 D; 417/409; 417/406

(58) Field of Classification Search ................ 417/406, 417/407, 409; 60/605.1; 48/198.7, 192; 123/198 D, 563; 415/178
See application file for complete search history.

(56) References Cited

U.S. PATENT DOCUMENTS

| | | | | |
|---|---|---|---|---|
| 2,421,518 A | * | 6/1947 | Molloy | 60/605.1 |
| 2,698,050 A | * | 12/1954 | Bloomer et al. | 60/737 |
| 2,795,109 A | | 6/1957 | Hryniszak | 60/39.511 |
| 2,865,611 A | | 12/1958 | Bentele | 165/9 |
| 2,866,617 A | | 12/1958 | Land | 417/406 |
| 3,472,419 A | * | 10/1969 | King | 220/88.2 |
| 3,577,726 A | | 5/1971 | Wagner | 60/605.1 |
| 4,068,612 A | | 1/1978 | Meiners | 60/605.1 |
| 4,080,149 A | | 3/1978 | Wolfe | 431/1 |
| 4,187,678 A | | 2/1980 | Herenius | 60/321 |
| 4,671,060 A | * | 6/1987 | Wilkens | 48/192 |

(Continued)

FOREIGN PATENT DOCUMENTS

BR 8700406 8/1988

(Continued)

OTHER PUBLICATIONS

International Search Report for International Application No. PCT/AU03/00484 Dated May 29, 2003.

*Primary Examiner*—Thai-Ba Trieu
(74) *Attorney, Agent, or Firm*—Greenberg Traurig, LLP

(57) ABSTRACT

A flame trap housing 36 for a flame trap 34 of a compression ignition engine has an inlet 38 configured to engage an air outlet of a turbocharger and an outlet 40 configured to engage an inlet of an inlet after-cooler. The housing 36 is double skinned, having an inner skin 46 defining a flame trap compartment 35 and an outer skin 48 arranged in a spaced relationship relative to the inner skin 46, to define a fluid flow path 52 for the flow of a cooling fluid about the inner skin 46 of the housing 36.

7 Claims, 3 Drawing Sheets

U.S. PATENT DOCUMENTS

| | | | |
|---|---|---|---|
| 4,685,292 A * | 8/1987 | Brigham et al. | 60/320 |
| 4,693,084 A | 9/1987 | Ahrens | 123/563 |
| 4,788,824 A * | 12/1988 | Spurr et al. | 60/671 |
| 5,261,356 A | 11/1993 | Takahashi et al. | 123/563 |
| 5,303,253 A | 4/1994 | Henning et al. | 372/58 |
| 5,375,565 A | 12/1994 | Maxson et al. | 123/198 D |
| 5,528,902 A | 6/1996 | Hoerl et al. | 60/612 |
| 5,582,156 A | 12/1996 | Cullum et al. | 123/672 |
| 5,709,187 A | 1/1998 | Jaeger et al. | 123/198 D |
| 5,857,332 A | 1/1999 | Johnston et al. | 407/417 |
| 6,705,267 B1 * | 3/2004 | Westerbeke et al. | 123/184.53 |
| 6,942,017 B2 | 9/2005 | Gokan et al. | 123/563 |
| 7,077,113 B2 | 7/2006 | Bilek et al. | 123/563 |
| 2003/0017765 A1 | 1/2003 | Gokan et al. | 440/88 |
| 2007/0113476 A1 | 5/2007 | Thomas et al. | 48/198.7 |

FOREIGN PATENT DOCUMENTS

| | | |
|---|---|---|
| DE | 3439738 A1 | 4/1986 |
| DE | 10344868 A1 | 4/2005 |
| EP | 14941 A * | 9/1980 |
| JP | 55142932 A | 11/1980 |
| JP | 11022474 A | 1/1999 |
| JP | 2003035153 A | 2/2003 |
| WO | WO 9533918 A1 | 12/1995 |

* cited by examiner

TURBOCHARGED COMPRESSION IGNITION ENGINE

RELATED APPLICATION

This application is a Divisional of U.S. Utility patent application Ser. No. 10/528,819, filed Mar. 21, 2005, which is a national stage filing under 35 U.S.C. 371 of International Application PCT/AU03/00484, filed Apr. 23, 2003, which claims priority from Australian Application No. 2002951688, filed Sep. 25, 2002. The entire teachings of the referenced Applications are incorporated herein by reference.

BACKGROUND

1. Field

This invention relates to a turbocharged compression ignition engine. More particularly, the invention relates to components for a turbocharged compression ignition engine and to a compression ignition engine including such components.

2. General Background

Mining environments are clearly hazardous environments where extreme safety precautions must always be considered and upgraded. Of particular importance, are the safety measures designed with regard to the combustibility of the material being mined. Any object brought into a mine can either create a spark or simply heat up to temperatures above a critical ignition temperature which can cause explosions. This is a serious problem within coal mines, in particular, since coal dust can spontaneously ignite at temperatures of about 160° C. to 170° C. This means that any object introduced into the mines must not emit flames or sparks and surfaces must remain well below critical temperatures.

Heavy machinery is used throughout the mining industry to move materials around the mines, in particular LHD (Load Haul Dump) machines. These machines require a great deal of power to move heavy loads. Ideally turbocharged engines should be used since they increase the amount of power in comparison with a naturally aspirated engine of similar capacity without suffering a significant fuel consumption disadvantage.

However, turbochargers of compression ignition engines have surface temperatures in excess of 150□C and as a result temporary measures have been implemented on and around 'hot spots' to reduce the surface temperature of the turbochargers and increase safety measures. As a consequence of the unreliable nature of this temporary method, non-turbocharged engines have been traditionally used since their surface temperatures remain below the critical temperatures, although they continue to remain inefficient in light of the present technology.

In addition to the problems associated with the surface temperatures of the turbocharger, flames or sparks emitted from the engines or occurring within the engine itself, also present a potential danger. As a result, flame traps are positioned within the engine system to arrest the transmission of flames.

At present, the arrangement is such that the flame traps are situated at the inlet of the turbocharger so that the aftercooler is situated directly off the turbocharger at a right angle. This arrangement does not optimise the space constraints within the engine and furthermore the arrangement of the flame trap, turbocharger and aftercooler do not optimise fluid flow rates within the system. Thus there is a need for improved methods to increase the efficiency and safety of the turbocharged compression ignition engine.

SUMMARY

According to a first aspect of the invention, there is provided a component for a turbocharger, the component including;

a housing defining a chamber for a predetermined part of the turbocharger; and a jacket surrounding the housing, the jacket being arranged in a spaced relationship relative to an outer surface of the housing to define a fluid path about said outer surface of the housing, the fluid path having a fluid inlet and a fluid outlet.

A preferred embodiment may comprise the fluid path having the fluid outlet situated at a furthermost position from the fluid inlet, so that, in use, the effect of the cooling fluid is maximised since it covers a larger portion of the outer surface of the housing and hence increases the efficiency of the cooling arrangement.

The housing may be a compressor housing of the turbocharger and may have an air inlet for receiving uncompressed air and an air outlet for discharging compressed air to an engine.

The jacket may be of aluminium and may be attached to the housing by welding by appropriate choice of welding techniques.

The invention extends also to a turbocharger having a component as described above.

According to a second aspect of the invention, there is provided a flame trap housing for a flame trap of a compression ignition engine, the housing having an inlet configured to engage an air outlet of a turbocharger and an outlet configured to engage an inlet of an inlet after-cooler, the housing being double skinned, having an inner skin defining a flame trap compartment and an outer skin arranged in a spaced relationship relative to the inner skin, to define a fluid path for the flow of a cooling fluid about the inner skin of the housing.

The housing may define a cooling fluid inlet and a cooling fluid outlet of the fluid path. Further, the cooling fluid outlet may be situated at a furthermost position on the housing relative to the cooling fluid inlet so that, in use, the effect of the cooling fluid is maximised since it traverses a larger portion of the inner skin of the housing and hence increases the efficiency of the cooling arrangement.

According to a third aspect of the invention there is provided a fluid input assembly for a compression ignition engine, the assembly including a turbocharger;

a flame trap, as described above, connected to an outlet of the turbocharger; and an inlet after-cooler connected to an outlet of the flame trap.

The turbocharger may include a component as described above. The fluid outlet of the jacket of the compressor housing may be in fluid communication with the cooling fluid inlet of the flame trap housing.

The invention extends still further to a compression ignition engine including a fluid input assembly as described above.

DRAWINGS

The invention is now described by way of example with reference to the accompanying drawings in which.

DETAILED DESCRIPTION

Figure 1:
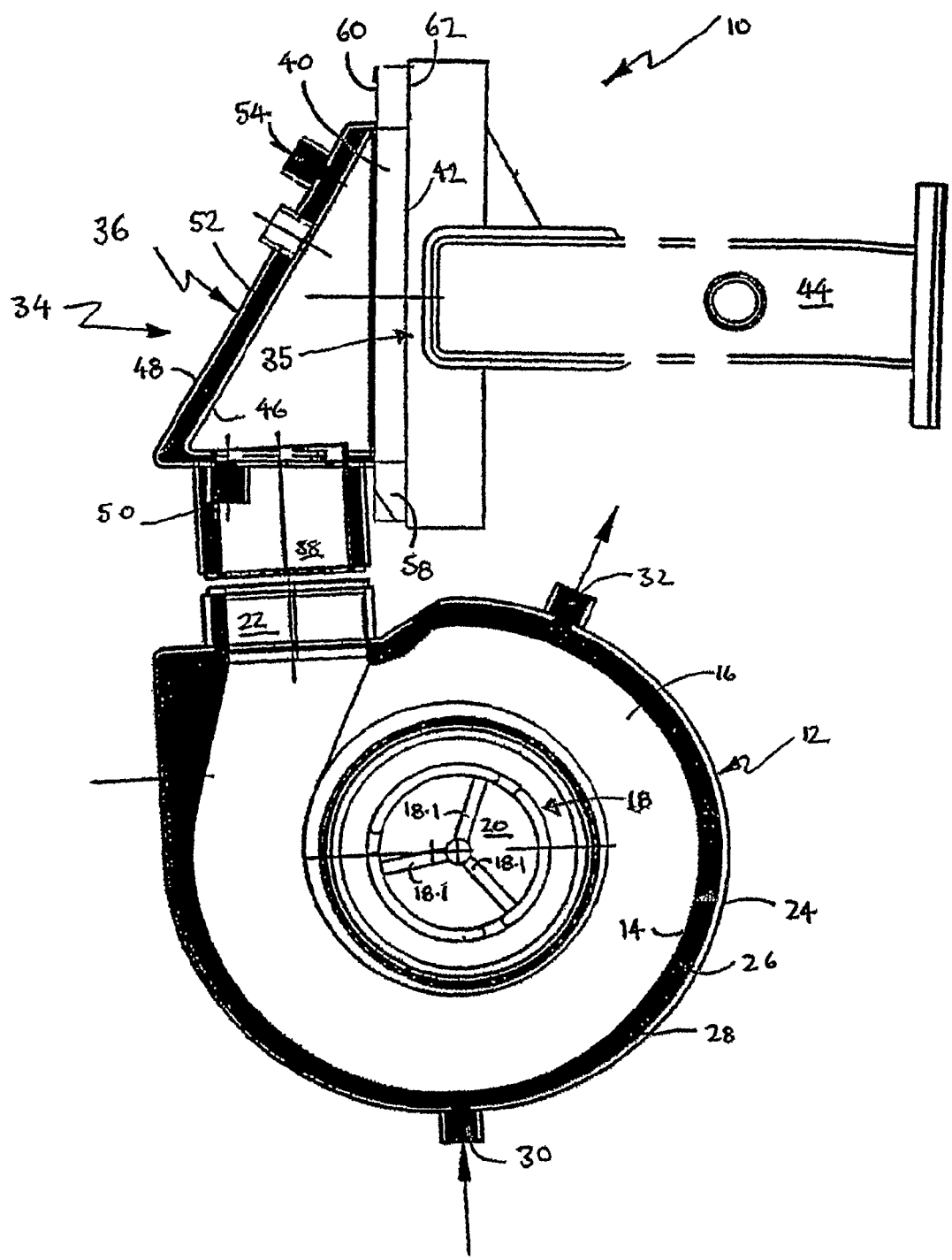
FIG. 1 shows a side view of a fluid input assembly, in accordance with an aspect of the invention, for a compression ignition engine.
Figure 2:
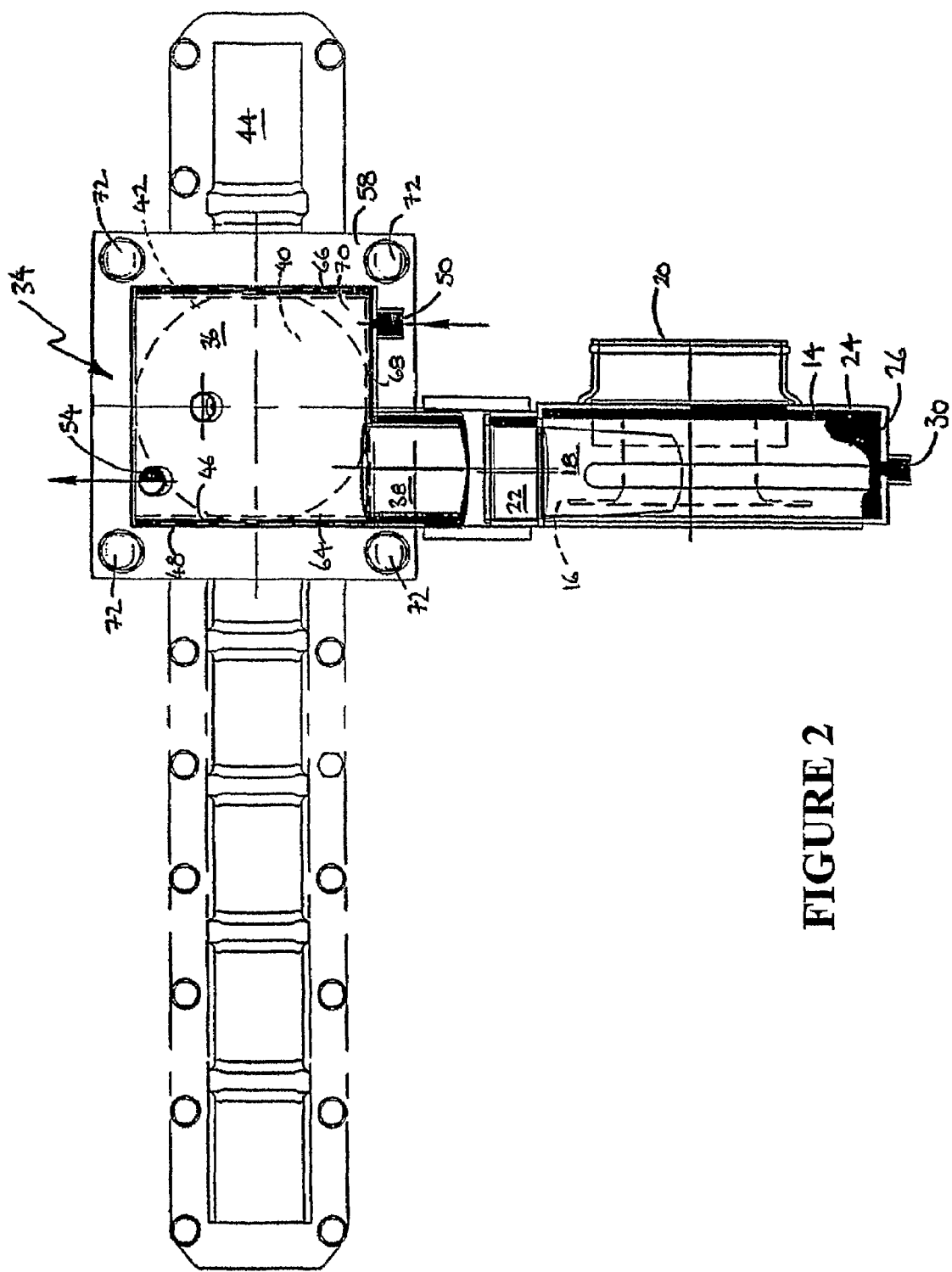
FIG. 2 shows a plan view of the fluid input assembly.

Referring initially to FIGS. 1 and 2 of the drawings, an embodiment of a fluid input assembly for a turbocharged compression ignition engine arrangement is illustrated and is generally designated by reference numeral 10.

Figure 3:
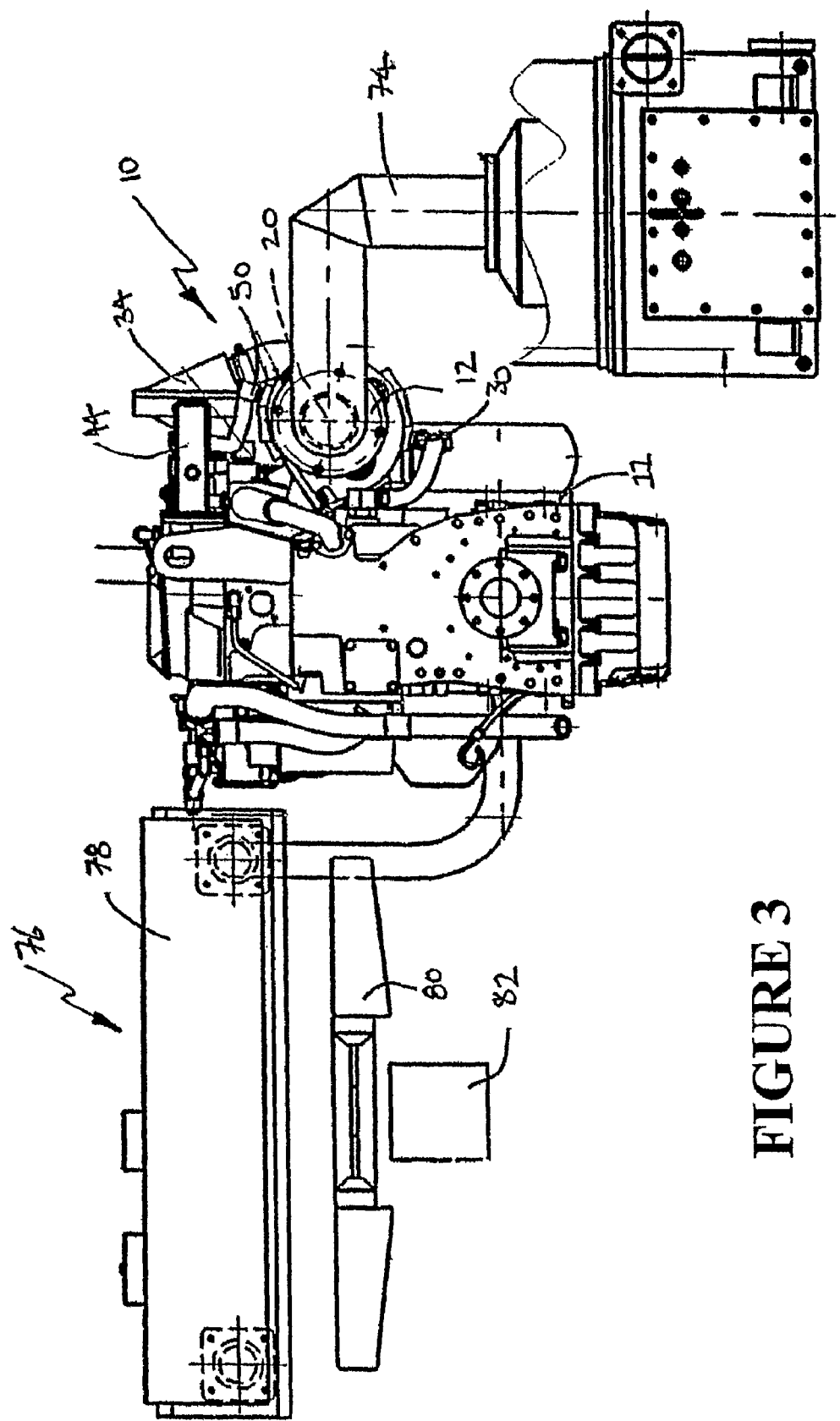
FIG. 3 shows a side view of a fluid cooled turbocharged, compression ignition engine.

The assembly 10 comprises a turbocharger 12 for a compression ignition engine 11 (FIG. 3). The turbocharger 12 includes a housing 14, in accordance with a first aspect of the invention, defining a chamber 16 for a predetermined part, more particularly, a compressor 18 of the turbocharger 12. The compressor 18 comprises a plurality of radially extending blades 18.1 which draws air through an inlet 20 and expels the resulting air through an outlet 22.

The assembly 10 further comprises a flame trap 34 having a housing 36, also in accordance with an aspect of the invention and which will be described in greater detail below.

A jacket 24 surrounding the housing 14 of the turbocharger 12 is arranged in a spaced relationship relative to an outer surface 26 of the housing 14 to define a fluid path 28 about said outer surface of the housing 14, the fluid path 28 having a fluid inlet 30 and a fluid outlet 32.

A preferred embodiment of the invention has the fluid outlet 32 of the fluid path 28 situated at a furthermost position from the fluid inlet 30, so that, in use, the effect of the cooling fluid is maximised since it covers a larger portion of the outer surface 26 of the housing 14 and hence increases the heat-exchange efficiency of the cooling arrangement generally indicated at 12. As the housing 14 is substantially circular, this entails having the fluid inlet 30 and the fluid outlet 32 arranged in about diametrically opposed positions on the jacket 24.

The housing 36 of the flame trap 34 has an inlet 38 configured to engage the outlet 22 of the turbocharger 12 and an outlet 40 configured to engage an inlet 42 of an inlet after-cooler 44.

The housing 36 of the flame trap 34 is fluid cooled. Hence the housing 36 is double skinned having an inner skin 46, an inner surface of which is in communication with a flame trap compartment 35, and an outer skin 48 arranged in spaced relationship relative to the inner skin 46 of the housing 36 to form a fluid path 52. The fluid path 52 defines a cooling fluid inlet 50 and a cooling fluid outlet 54. A fluid trap element (not shown) is received in the compartment 35.

A preferred embodiment of the flame trap housing 36 comprises the fluid path 52 having the cooling fluid outlet 54 situated at a furthermost position from the cooling fluid inlet 50, so that, in use, the heat-exchange effect of the cooling fluid is maximised since it traverses a larger portion of the inner skin 46 of the flame trap housing 36 and hence increases the efficiency of the cooling arrangement.

In this embodiment of the invention, the flame trap 34 includes a body portion 58 having a first surface 60 and a spaced, second surface 62 and defining the flame trap outlet 40. The housing 36 has two parallel triangular side walls 64 and 66 (FIG. 2) extending from the surface 60 of the body portion 58. The walls 64, 66 are bridged by a bottom member 68, which extends from the surface 60 of the body portion 58. The flame trap inlet 38 is defined through the bottom member 68. An outer plate 70 defines an inlet to the flame trap compartment 35.

Furthermore, the surface 62 of the body portion 58 abuts the inlet after-cooler 44. The body portion 58 provides an attachment means for attaching the flame trap housing 36 to the inlet after-cooler 44 using, for example, bolts 72.

The flame trap housing 36 acts as an elbow connecting the turbocharger 12 to the inlet after-cooler 44, and serves to trap any blow back from the compression ignition engine to inhibit escape of sparks.

In use, the fluid input assembly 10 for the compression ignition engine 11 includes the turbocharger 12, the flame trap 34 connected to an outlet 22 of the turbocharger and the inlet after-cooler 44 connected to an outlet 38 of the compartment 35 of the housing 36.

The fluid path 28 of the turbocharger 12 is in fluid communication with the fluid path 52 of the flame trap housing 36.

Thus, cooling fluid enters the assembly 10 through the fluid inlet 30 of the turbocharger 12, circulates through the cooling fluid path 28 and is discharged through the fluid outlet 32. The fluid path 28 of the turbocharger 12 is coupled via a suitable conduit (not shown) to the fluid path 52 of the flame trap housing 36 so that the fluid outlet 32 of the turbocharger 12 discharges the cooling fluid to the fluid inlet 50 of the flame trap housing 36. The cooling fluid circulates through the fluid path 52 of the housing 36 and is discharged through the fluid outlet 54 back into a cooling system of the engine 11.

The fluid input assembly 10 is shown, in use, mounted on the compression ignition engine 11 in FIG. 3 of the drawings. The air is injected into the turbocharger 12 via the air inlet 20 from an inlet manifold 74. The compressed air is discharged from the turbocharger 12 via the outlet 22 to the flame trap housing 36. The compressed air is then injected into the engine 11 via the inlet after-cooler 44.

The engine 11 is cooled by a cooling system 76, having a radiator 78 and a cooling fan 80 which is controlled by a fan motor 82. Cooling fluid circulating through the fluid input assembly 10 is fed back into the cooling system 76.

An advantage of the invention is that a fluid input assembly 10 is provided which the applicant believes will operate at a temperature lower than the highest permitted temperature in adverse environments. This allows turbocharged compression ignition engines to be used in such environments.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A flame trap housing for a flame trap of a compression ignition engine, the housing having an inlet configured to engage an air outlet of a turbocharger and an outlet configured to engage an inlet of an inlet after-cooler, the housing being double skinned, having an inner skin defining a flame trap compartment and an outer skin arranged in a spaced relationship relative to the inner skin, to define a fluid path for the flow of a cooling fluid about the inner skin of the housing.

2. The housing according to claim 1, which defines a cooling fluid inlet and a cooling fluid outlet of the fluid path.

3. The housing according to claim 1, in which the cooling fluid outlet is situated at a furthermost position on the housing relative to the cooling fluid inlet.

4. A fluid input assembly for a compression ignition engine, the assembly including:

a turbocharger;

a flame trap including a housing comprising an inlet connected to an air outlet of a turbocharger and an outlet configured to engage an inlet of an inlet after-cooler, the housing being double skinned and having an inner skin defining a flame trap compartment and an outer skin arranged in a spaced relationship relative to the inner skin, to define a fluid path for the flow of a cooling fluid about the inner skin of the housing; and an inlet after-cooler connected to an outlet of the flame trap housing.

5. The assembly as claimed in claim 4 in which the turbocharger includes a component comprising a turbocharger housing defining a chamber for a predetermined part of the turbocharger; and a jacket surrounding the turbocharger housing, the jacket being arranged in a spaced relationship relative to an outer surface of the turbocharger housing to define a fluid path about the outer surface of the turbocharger housing, the component having a cooling fluid inlet and a cooling fluid outlet.

6. The assembly as claimed in claim 5, in which the cooling fluid outlet of the turbocharger housing of the component is in fluid communication with a cooling fluid inlet of the housing of the flame trap.

7. A compression ignition engine which includes the fluid input assembly as claimed in claim 4.

* * * * *